(12) United States Patent
Johnson et al.

(10) Patent No.: US 11,305,552 B1
(45) Date of Patent: Apr. 19, 2022

(54) DYNAMIC SCAN QUALITY CONTROL MANAGEMENT FOR PRINT JOBS

(71) Applicants: Scott R. Johnson, Erie, CO (US); Nathan Young, Boulder, CO (US); Raymond Godefroid, Boulder, CO (US)

(72) Inventors: Scott R. Johnson, Erie, CO (US); Nathan Young, Boulder, CO (US); Raymond Godefroid, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/183,087

(22) Filed: Feb. 23, 2021

(51) Int. Cl.
| | |
|---|---|
| *B41J 2/21* | (2006.01) |
| *G06K 15/00* | (2006.01) |
| *G06K 15/02* | (2006.01) |
| *G06K 15/10* | (2006.01) |
| *G06T 7/00* | (2017.01) |

(52) U.S. Cl.
CPC .......... *B41J 2/2142* (2013.01); *G06K 15/002* (2013.01); *G06K 15/027* (2013.01); *G06K 15/102* (2013.01); *G06K 15/408* (2013.01); *G06T 7/001* (2013.01); *G06T 2207/30144* (2013.01)

(58) Field of Classification Search
CPC ... B41J 2/2142; G06K 15/002; G06K 15/027; G06K 15/102; G06K 15/408; G06T 7/001; G06T 2207/30144
See application file for complete search history.

(56) References Cited

U.S. PATENT DOCUMENTS

| | | | |
|---|---|---|---|
| 6,371,590 B1 | 4/2002 | Hah | |
| 6,533,384 B1 | 3/2003 | Vega et al. | |
| 6,652,064 B2 | 11/2003 | Bruch et al. | |
| 7,338,144 B2 * | 3/2008 | Mantell | B41J 2/2139 |
| | | | 347/19 |
| 7,762,639 B2 | 7/2010 | Silverbrook et al. | |
| 9,288,360 B1 * | 3/2016 | Dennison | H04N 1/00031 |
| 9,889,642 B2 | 2/2018 | Anderson et al. | |
| 10,545,844 B2 | 1/2020 | Dennison | |
| 2002/0141639 A1 | 10/2002 | Steinberg | |
| 2005/0225588 A1 | 10/2005 | King et al. | |
| 2008/0036803 A1 | 2/2008 | Yun | |

(Continued)

FOREIGN PATENT DOCUMENTS

KR   101208453 B1   12/2012

OTHER PUBLICATIONS

U.S. Appl. No. 16/712,985.

(Continued)

*Primary Examiner* — Quang N Vo
(74) *Attorney, Agent, or Firm* — Duft & Bornsen, PC

(57) ABSTRACT

Systems and methods are provided for reviewing printed jobs. One embodiment is a system that includes a print review device. The print review device includes a memory that stores data which indicates whether regions along a width of print media marked by a printer are flagged as bypassable, and a controller configured to determine printhead conditions along the width of the print media, associate each printhead condition with a corresponding region, and to generate a report with notifications of printhead conditions within each region that has not been flagged, while suppressing notifications of printhead conditions within regions that have been flagged.

20 Claims, 7 Drawing Sheets

(56) References Cited

U.S. PATENT DOCUMENTS

| | | |
|---|---|---|
| 2015/0373305 A1 | 12/2015 | Hauf et al. |
| 2018/0086049 A1 | 3/2018 | Ueshima |
| 2019/0168514 A1 | 6/2019 | Gazala |
| 2021/0178752 A1 | 6/2021 | Johnson et al. |
| 2021/0183036 A1 | 6/2021 | Gurudath et al. |

OTHER PUBLICATIONS

Web Inspection—Made by Hunkeler-Hunkeler AG Paper Processing; Dec. 23, 2019; https://www.hunkeler.ch/en/web-inspection-made-by-hunkeler.

* cited by examiner

DYNAMIC SCAN QUALITY CONTROL MANAGEMENT FOR PRINT JOBS

TECHNICAL FIELD

The following disclosure relates to the field of printing, and in particular, to analysis of printed output.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and one or more marking engines (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

In order to ensure that a print job has been printed at a desired level of quality, it is not uncommon for the output of a print job to be scanned. However, for print jobs that comprise thousands of pages, it is not feasible for a technician to manually review scans of those pages. Furthermore, a scanner may require its own maintenance and upkeep.

Thus, those who operate print shops continue to seek out enhanced systems and methods that permit the review of print jobs to be accomplished in an efficient and accurate manner.

SUMMARY

Embodiments described herein dynamically elect to forego inspection and/or reporting for error conditions along specific portions of test patterns on marked print media. This enables a print shop operator to continue printing incoming print jobs if the reduction in print quality caused by an error is not so significant as to require a re-print. For example, this process enables jetout conditions at a printhead to be selectively ignored if desired by a print shop operator, which provides a benefit by enabling printing to continue if the jetout is in a location not used by a print job (e.g., near a border or margin of the print media).

One embodiment is a system that includes a print review device. The print review device includes a memory that stores data which indicates whether regions along a width of print media marked by a printer are flagged as bypassable, and a controller configured to determine printhead conditions along the width of the print media, associate each printhead condition with a corresponding region, and to generate a report with notifications of printhead conditions within each region that has not been flagged, while suppressing notifications of printhead conditions within regions that have been flagged.

A further embodiment is a method. The method includes storing data which indicates whether regions along a width of print media marked by a printer are flagged as bypassable, determining printhead conditions along the width of the print media, associating each printhead condition with a corresponding region, and generating a report with notifications of printhead conditions within each region that has not been flagged, while suppressing notifications of printhead conditions within regions that have been flagged.

Yet another embodiment is a non-transitory computer readable medium embodying programmed instructions which, when executed by a processor, are operable for performing a method. The method includes storing data which indicates whether regions along a width of print media marked by a printer are flagged as bypassable, determining printhead conditions along the width of the print media, associating each printhead condition with a corresponding region, and generating a report with notifications of printhead conditions within each region that has not been flagged, while suppressing notifications of printhead conditions within regions that have been flagged.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
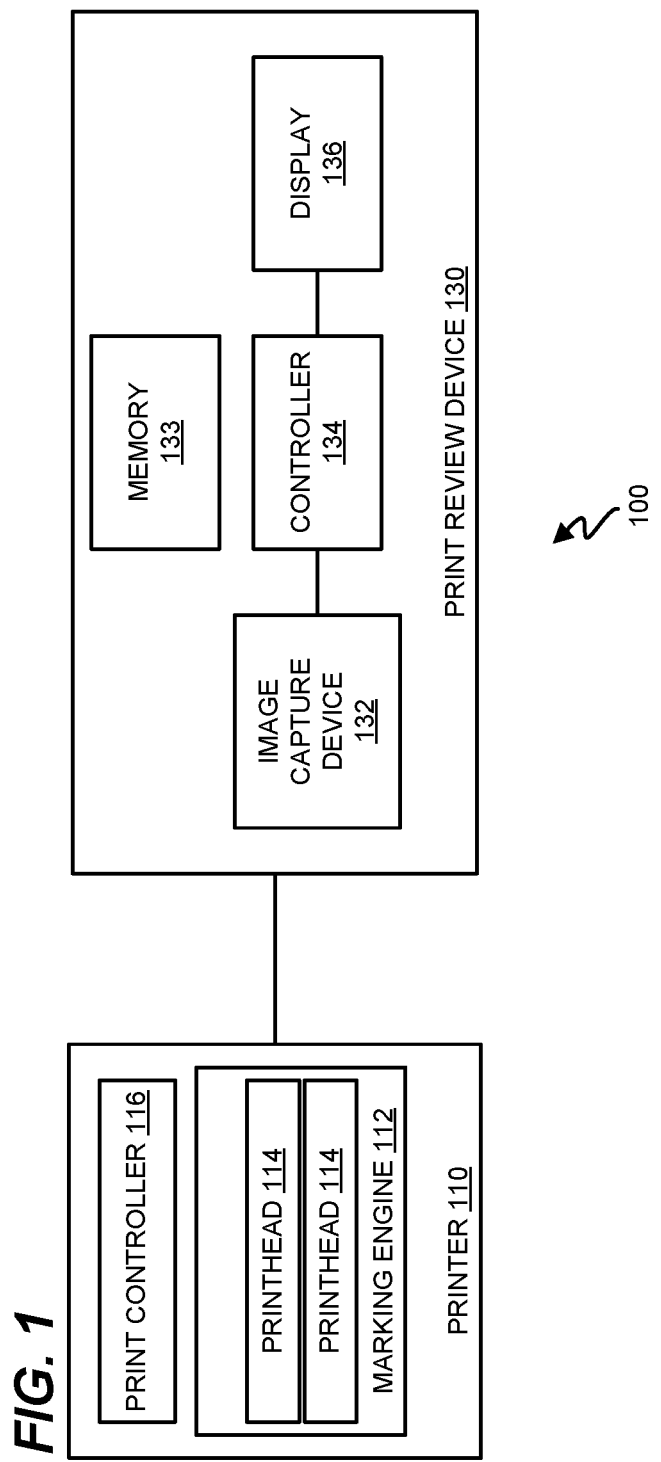
FIG. 1 is a block diagram of a print review system in an illustrative embodiment.

FIG. 1 is a block diagram of a print review system 100 in an illustrative embodiment. Print review system 100 comprises any system, device, or component operable to analyze images of print media that has been marked in accordance with print data in a print job. In this embodiment, print review system 100 comprises a print review device 130 that operates an image capture device 132 to generate images of print media marked by a printer 110, operates a controller 134 that detects printhead conditions based on the images of the print media, and operates a display 136 that presents notifications of printhead conditions to a user for review via a GUI. Though shown as incorporated in print review device 130, image capture device 132, controller 134 and display 136 may be implemented as separate and coupled devices. Thus, portions of controller 134 may be implemented separately (e.g., some portions included in image capture device 132 and other components may be implemented as separate, physically distinct components or devices) and communicatively coupled in various embodiments.

In this embodiment, print review device 130 has been enhanced to selectively bypass analysis and/or reporting of printhead conditions along specific widthwise regions of a web of print media that have been determined based upon analysis of widthwise regions of an image of the web of print media. Each region corresponds to a widthwise portion of the print media occupied by at least a portion of a printhead. Thus, a region corresponds with a specific widthwise portion of a test pattern which itself corresponds with a portion of the width of a marking engine of the printer. Test patterns comprise marks that are applied to print media before, during, or after printing in order to facilitate analysis of conditions at printheads (or nozzles thereof), and hence may be included as part of a print job. This selective, region-based analysis and/or reporting of printhead conditions enables printing to continue if errors (e.g., jetouts) are detected in regions that are not relevant to a print job (e.g., the margins of the page). This technique also reduces processing load, which facilitates detection and reporting of printhead conditions in real-time. As used herein, a printhead condition comprises any physical, electrical, or firmware status relating to a printhead, or portion thereof, which has an impact on the ability of the printhead to eject ink onto print media in accordance with supplied instructions. Examples of printhead conditions include "jetout," "fully operational," "low ink," and others. Printhead condition data may include location information as well as descriptive information of the printhead condition. Printhead conditions may be associated with a region (and vice versa) by mapping the locations (e.g., locations along a web or pixel locations in an image of the web) indicated in printhead condition data to the regions. Printhead condition data may also be associated with printheads or nozzles (or vice versa) by mapping. The mapping may be based on the corresponding printhead location information, image of the printed test pattern, test pattern print instructions and printer 110 configuration information (e.g., the physical/electrical arrangement and interconnections of device within the printer 110 such as printheads, nozzles, print controller, color planes and/or etc.)

Printer 110 comprises any system, device, or component operable to mark print media (e.g., paper, card stock, paper board, corrugated fiberboard, film, plastic, synthetic, textile, glass, composite or any other tangible medium suitable for printing) in accordance with received instructions in print data for a print job. In this embodiment, printer 110 comprises a continuous-forms printer that marks a web of print media which travels through the printer 110 in a web direction (also referred to as a "process direction"). Specifically, printer 110 includes a print controller 116 that directs the operations of one or more marking engines 112, which each comprise one or more arrays of printheads 114. The printheads 114 operate nozzles to eject ink or other marking materials onto the print media in accordance with instructions from the print controller 116 as the print media advances. In further embodiments, printer 110 comprises a cut-sheet printer that marks sheets or strips of print media.

Print review device 130 comprises any device capable of imaging and/or reviewing the printed output of printer 110. In this embodiment, print review device 130 is integrated into the printer 110. In further embodiments, print review device 130 is integrated with or coupled to a web of print media at a location that is downstream of the printer 110 with respect to a web direction along which the web proceeds. Image capture device 132 comprises any suitable image capture device (e.g., optical scanner, camera, densitometer, etc.) and captures (e.g., acquires) images of the print media after printing. Image capture device 132 may periodically acquire images of the print media via a single camera or an array of cameras. In embodiments where an array of cameras is used, the image capture device 132 may stitch images from cameras in the array together, in order to generate a composite image that extends across a width of the print media (i.e., a direction perpendicular to a process direction of the web of print media).

In one embodiment, image capture device 132 scans the print media/acquires images periodically and/or in real-time as the printer 110 continues marking the print media and the print media advances. For example, image capture device 132 may time acquisition of images such that the images depict each instance of a test pattern that is periodically printed by the printer 110 onto the print media (e.g., every page, every ten pages, every one hundred pages, etc.). In one embodiment, the printer is capable of printing at a higher number of Dots Per Inch (DPI) than the scanner (e.g., twelve hundred DPI as printed, as compared to six hundred DPI as scanned). In such an embodiment, a test pattern may be split and printed into physically distinct sections, wherein each section utilizes a different combination of nozzles to print at the DPI rate supported by the scanner, enabling accurate review and analysis. In a further embodiment, the resolution of images acquired by the image capture device 132 is chosen such that each pixel in the image corresponds with a size equal to or less than that of a droplet of ink applied by a nozzle at a printhead.

The images acquired by the image capture device 132 may be stored in memory 133, and are analyzed by a controller 134. Controller 134 comprises any system, component, or device that characterizes images of a web of print media that has been marked by a printer 110. To perform this operation, controller 134 may compare the images to corresponding target data (e.g., as stored in memory 133) that represents an ideal image of print media that has been marked exactly in accordance with the instructions for a print job. In another embodiment, controller 134 operates image capture device 132 by communicating instructions or settings to the image capture device 132. Controller 134 may be implemented as custom circuitry, as a hardware processor executing programmed instructions, etc.

Based on a comparison of the images of print media to the target data, controller 134 is capable of detecting and/or reporting printhead conditions. For example, controller 134 may detect the presence of defects or other conditions at a printhead of the printer 110, such as jetouts (i.e., the condition of failing to apply ink to the print media), in accordance with the techniques described in U.S. patent application Ser. No. 16/712,985 filed on Dec. 12, 2019, entitled "ENHANCED PRINT DEFECT DETECTION," and herein incorporated by reference. In one embodiment, controller 134 additionally receives notifications from a controller of the printer 110, such as notifications that firmware updates are available. In one embodiment, controller 134 further categorizes printhead conditions that have been detected. For example, controller 134 may assign notifications to types/categories comprising informational notifications, warning notifications, and error notifications.

Controller 134 generates a GUI that notifies a print shop operator of printhead conditions, and directs display 136 to present the GUI to a user. Display 136 comprises any suitable device for visually displaying digital information, and may comprise a monitor, projector, touchscreen, etc. In this embodiment, controller 134 has been beneficially enhanced to selectively bypass detection and/or reporting of printhead conditions, on a region-by-region basis.

The particular arrangement, number, and configuration of components described herein is illustrative and non-limiting. Illustrative details of the operation of print review system 100 will be discussed with regard to FIG. 2. Assume, for this embodiment, that a printer 110 has received print data for a print job (e.g., Portable Document Format (PDF) data accompanied by a Job Definition Format (JDF) job ticket), and has initiated printing of the print job onto a web of print media. This includes the printer 110 printing test patterns (e.g., a series of stripes or other patterns marked with ink from the printheads 114) onto the print media. As the print media advances from the printer 110, it passes downstream into view of image capture device 132.

Figure 2:
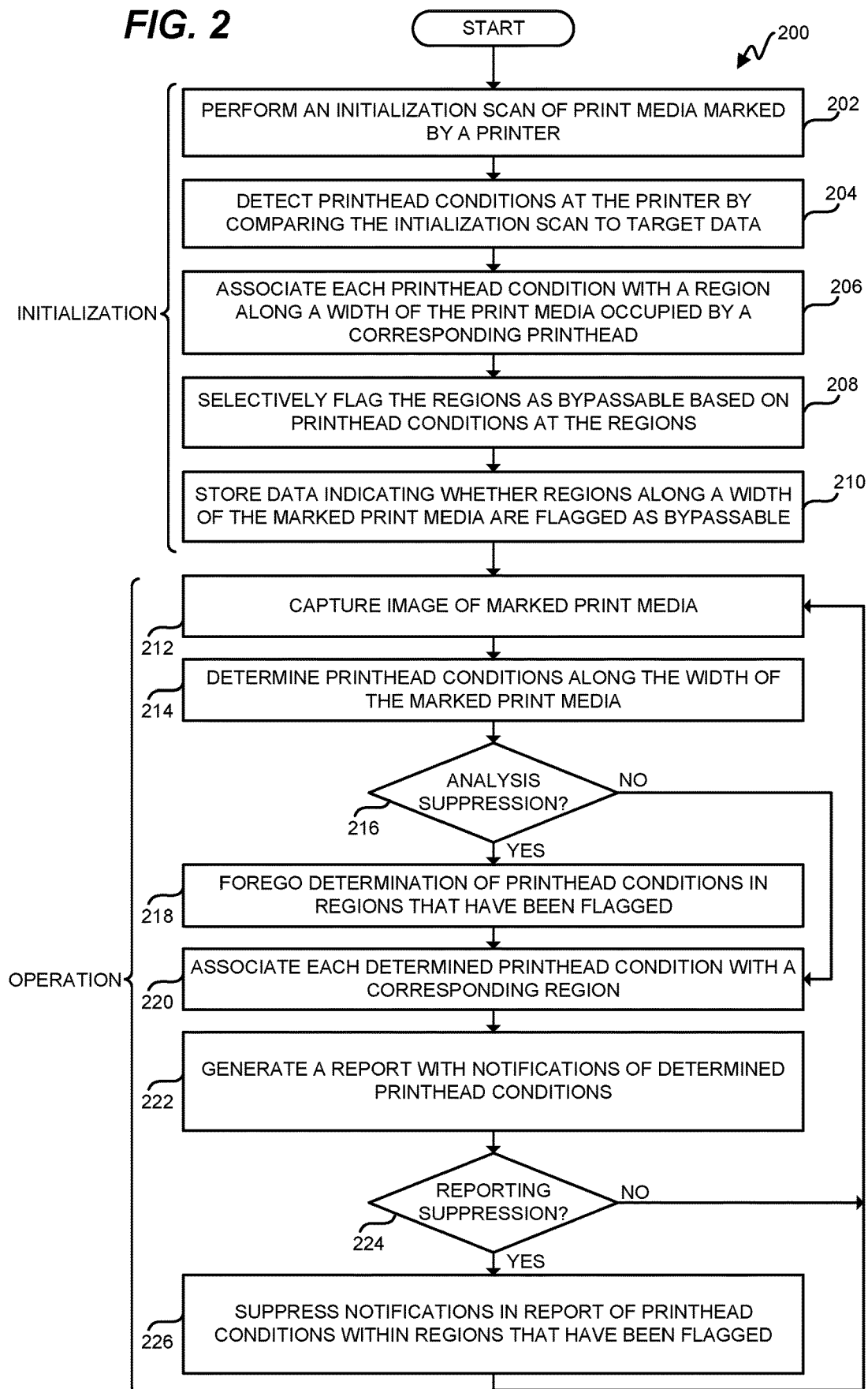
FIG. 2 is a flowchart illustrating a method for operating a print review system to dynamically suppress detection and/or reporting of printhead conditions in an illustrative embodiment.

FIG. 2 is a flowchart illustrating a method 200 for dynamically suppressing detection and/or reporting of printhead conditions in specific regions of print media in an illustrative embodiment. The steps of method 200 are described with reference to print review system 100 of FIG. 1, but those skilled in the art will appreciate that method 200 may be performed in other systems. The steps of the flowcharts described herein are not all inclusive and may include other steps not shown. The steps described herein may also be performed in an alternative order.

In this embodiment, the method is subdivided into initialization and operation phases. Steps 202-210 describe illustrative steps of an initialization phase. However, other initialization techniques may be utilized as desired. At the end of the initialization phase, memory 133 includes data indicating which regions of the print media are bypassable for purposes of determining or reporting printhead conditions. Thus, when the operation phase initiates, print review device 130 is capable of dynamically performing suppression of printhead condition detection and/or reporting in the bypassable regions.

In this embodiment, the initialization phase includes step 202, in which image capture device 132 performs an initialization scan of print media marked by the printer 110. The initialization scan may be performed after printer 110 has been turned on, after printer 110 has been set up in a new configuration, at the start of a new print job, in response to a manual command, or based on other criteria. During the initialization scan, image capture device 132 proceeds to generate images of the print media, such as images of a test pattern at the print media. The images may comprise static images (e.g., digital images in a format such as Joint Photographic Experts Group (JPEG), Graphics Interchange Format (GIF), Portable Network Graphics (PNG), etc.), frames of video footage, or other content. The images are acquired at a resolution that enables a quality of marked print media to accurately analyzed. For example, the images may be acquired at a resolution that equals the print quality of the current job (e.g., six hundred Dots Per Inch (DPI), twelve hundred DPI, etc.), or at a resolution such that at least one pixel exists to represent output from each nozzle at printheads of the printer 110.

The memory 133 of the print review device 130 stores the images of the print media, and these images are reviewed by controller 134. In one embodiment, the controller 134 is integrated into the print review device 130 and receives the images directly from the image capture device 132, while in further embodiments the controller 134 is implemented remotely (e.g., at a print server that manages the print shop) and receives the images via a network or file system.

In step 204, the controller 134 (or other component) detects printhead conditions at the printer 110 by comparing the initialization scan to target data stored in memory 133. In one embodiment, this operation comprises reviewing test patterns depicted in the images, and comparing the test patterns to target data. If the test patterns do not match the target data at specific locations along a width of the print media, this may be indicative of a printhead condition in the form of a defect at a printhead or nozzle. Further analysis may be performed in accordance with the techniques discussed in U.S. patent application Ser. No. 16/712,985 in order to identify defects related to printing. Each defect may be indicative of a specific printhead condition. In another embodiment, Step 204 may instead be performed by reading data stored in memory 133 indicating printhead conditions detected by another device or component.

In step 206, the controller 134 associates each printhead condition with a region along a width of the print media occupied by a corresponding printhead. Thus, a printhead condition detected within a region occupied by a first printhead is associated with the region of the first printhead. In further embodiments, controller 134 operates on a granular basis, such that printhead conditions pertaining to specific nozzles are, in addition to being associated with the region of a corresponding printhead 114, are also associated with a specific widthwise location within the region.

In step 208, the controller 134 selectively flags one or more of the regions as bypassable based on the printhead conditions at the regions. In one embodiment, this comprises automatically generating a report indicating the type of printhead condition within each region, and awaiting manual input indicating that the region is bypassable. This may be beneficial when a print job does not include printable content in a region that has an undesirable printhead condition. It may also be beneficial if undesirable printhead conditions are found within regions that will be cut from the print job before delivery to a customer. In further embodiments, the controller 134 automatically flags regions as bypassable based on detected printhead conditions. In a further embodiment, a test pattern referred to as an initialization inspection pattern is utilized to evaluate each nozzle independently and determine if any nozzles become unrecoverable. This information is then related to test patterns during printing to dynamically determine which regions to bypass.

In one embodiment, the data that flags the regions as bypassable is provided to a print controller of the printer 110. In such an embodiment, the printer 110 foregoes global error handling settings (e.g., stopping the printer, transmitting a warning message, and/or initiating recovery actions, etc.) in regions that are flagged as bypassable. Thus, detection of a printhead condition that would normally halt printing does not halt printing, if the printhead condition is in a region flagged as bypassable.

Flagging regions as bypassable results in a notable technical benefit because it allows for printhead conditions to be selectively ignored. This eliminates the need for a print shop operator to manually re-initiate printing of a job each time a jetout is detected that has low or no impact on a print job.

This in turn reduces paper waste by enabling printing to continue, even when printhead conditions would otherwise halt printing and require reprint of a print job.

In step 210, data indicating whether regions along the width of the print media are bypassable is stored by controller 134 in memory 133. In one embodiment, this comprises populating a table with the data for each region, and applying a flag in the table to each region that is bypassable. In further embodiments, the flagging is performed on a granular basis. That is, a printhead condition at a specific location within a printhead 114 (e.g., along a location corresponding with a width of ten to fifteen nozzles at a printhead, or more) may result in a flag being assigned to that specific location, instead of the entire region. In further embodiments, bypass flags may be assigned to entire color planes/channels (e.g., cyan, magenta, yellow, and key black), and/or bypass flags may be assigned to specific color planes within a region. For example, a bypass flag may be assigned to a widthwise region that receives marks from C, M, Y, and K printheads, and may be set to bypass printhead conditions for all of the printheads, any combination of colors set down by the printheads (e.g., to bypass C but not K), etc.

With the initialization phase completed, print review system 100 includes data indicating which regions of the print media (corresponding with specific printheads) are flagged as bypassable. Processing therefore proceeds to an operation phase, wherein printing continues and/or additional test patterns are generated. During the operation phase, the data created in the initialization phase may be utilized to selectively bypass determination and/or reporting of printhead conditions.

In step 212, image capture device 132 captures one or more images of (e.g., scans) marked print media. In one embodiment, image capture device 132 scans test patterns at the marked print media to generate the images in real-time as printing occurs at printer 110. In further embodiments, image capture device 132 performs a scan at the start of a print job, dynamically in response to detecting the start of a print job, the passage of a certain number of pages of content or a new test pattern, or in response to triggering instructions from a print controller of the printer 110. Images generated by the image capture device 132 are stored in memory for analysis by controller 134 or other components. The quality and type of scanning performed may be implemented in a similar manner to step 202.

In step 214, the controller 134 determines printhead conditions along the width of the marked print media. This may be performed in a similar manner to step 204, or may be performed by reading data stored in memory 133 indicating printhead conditions detected by another device or component. The data describing bypassable regions can be utilized to suppress analysis of specific regions along the width of the print media. This provides a technical benefit by reducing load on the image capture device 132 and/or controller 134 as printing continues.

If analysis suppression is activated in step 216, then print review device 130 foregoes determination of printhead conditions in regions that have been flagged in step 218. Thus, controller 134 (or any other component performing image analysis) may bypass analysis heuristics within the flagged regions, which saves processing power at the controller 134. In a further embodiment, image capture device 132 selectively prevents acquisition of images within regions that have been flagged, or omits image data for flagged regions.

In step 220, each determined printhead condition is associated with a corresponding region. Step 220 may be performed in a manner such that it is integrated with steps 214-218. That is, in many embodiments, the act of associating printhead conditions with specific regions may be performed at the time the printhead conditions are detected. Step 220 may be performed in a manner similar to step 206 above.

In step 222, the controller 134 generates a report with notifications of determined printhead conditions. Different notifications may be prepared for different printhead conditions (e.g., defects) discovered the techniques discussed in U.S. patent application Ser. No. 16/712,985, based on the location and type of printhead conditions detected. The report may also include any combination of the following: printhead condition type, printhead condition location, printhead associated with the printhead condition, nozzle associated with the printhead condition, region associated with the printhead condition, associated color planes, printer status, system settings, notifications and/or currently flagged regions. The report may be in the form of signals, text data and/or graphic data. The report may be stored in memory 134 or transmitted.

In step 224, controller 134 determines whether reporting suppression is activated. Reporting suppression is an alternative to analysis suppression in step 216. Reporting suppression enables printhead conditions that have already been detected to be omitted from generated reports. If reporting suppression is activated, in step 226 controller 134 suppresses notifications from the report. Specifically, controller 134 suppresses notifications of printhead conditions within regions that have been flagged. This reduces visual clutter for a print shop operator reading the report.

In one embodiment the controller 134 generates a GUI that presents the report via the display 136. In a further embodiment, controller 134 is configured to generate multiple reports in real-time at the GUI 140 as the printer 110 marks the print media. The reports are generated based on input from image capture device 132 as the image capture device 132 scans the print media in real-time during printing. Performing these operations in real-time provides a technical benefit by enabling a print shop operator to immediately identify and rectify issues that may impact print quality for a print job.

Figure 3:
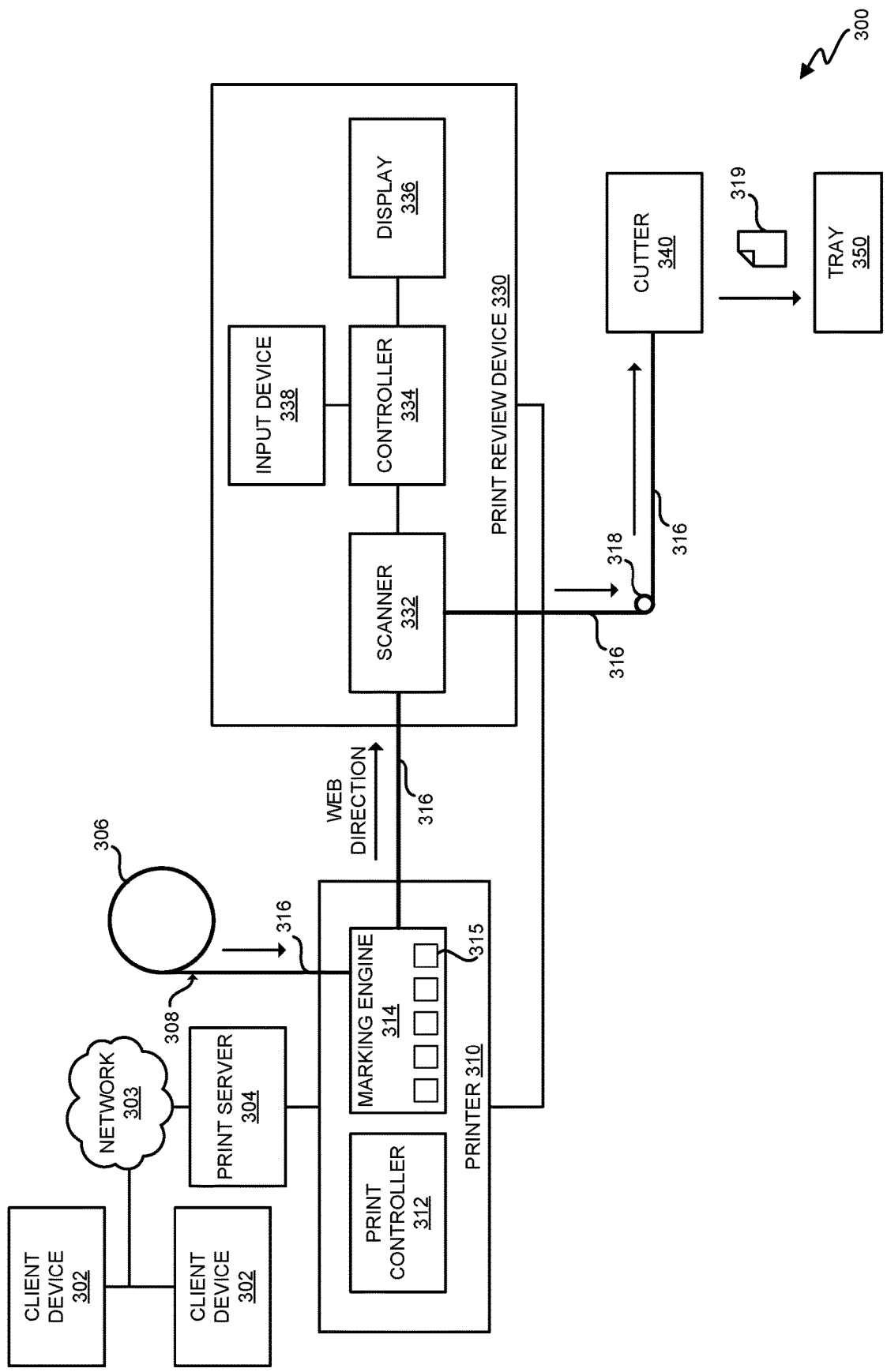
FIG. 3 is a block diagram of a print shop in an illustrative embodiment.

FIG. 3 is a block diagram of a print shop 300 in an illustrative embodiment.

Specifically, FIG. 3 illustrates a print shop environment in which print media may be reviewed. According to FIG. 3, a print server 304 at the print shop 300 receives print jobs from one or more client devices 302 (e.g., via a network 303 such as the Internet). The print jobs may comprise print data accompanied by a job ticket. The print server 304 schedules the print jobs for printing at one or more printers 310. To initiate printing of an individual print job, print server 304 transmits the print job to a printer 310. A print controller 312 at the printer 310 processes (e.g., rasterizes) the print data for the job in accordance with a job ticket for the print job, and generates instructions for a marking engine 314 at the printer 310. The marking engine 314 receives a web 316 of print media 308 from a unwinder 306, and marks the web 316 using printheads 315 which apply ink or another marking material (e.g., fluids, liquids, powders, etc. that are suitable for printing) to the web 316. Portions of the web 316 that have been marked advance downstream in a web direction to print review device 330. As these portions of the web 316 pass by scanner 332, the scanner 332 acquires images of the web 316. These images may be acquired each time a test pattern is recognized, periodically as new test patterns pass the scanner 332, or continuously in real-time. The portions of the web 316 advance to a cutter 340, via roller 318. The cutter 340 cuts the portions into pages 319 for stacking into a tray 350. In another embodiment, the portions of the web 316 exit the scanner 332 and advance towards a rewinder device that replaces cutter 340 (e.g., a roll-to-roll configuration).

Images acquired via scanner 332 are accessed by controller 334, which reviews the images in order to detect notifications related to the printing process. In this embodiment, controller 334 is coupled for communication with print controller 312 of printer 310, network 303 and/or print server 304. In such an embodiment, the controller 334 is configured to detect additional notifications based on communications with a print controller 312 of the printer, and include the additional notifications in a GUI. Examples of such notifications include a status of the printer 310 itself (e.g., pertaining to the existence of needed firmware upgrades, paper jam issues, etc.). In this embodiment, scanner 332 also provides notifications that are not directly related to the print job. For example, scanner 332 may report that a camera at the scanner 332 has stopped functioning, that the scanner 332 was unable to locate a test pattern on the web 316, etc.

In one embodiment, controller 334 combines the various received notifications together for presentation at a GUI via display 336. Controller 334 also dynamically suppresses and/or bypasses the detection and/or reporting of printhead conditions, based on internal logic. Notifications of printhead conditions may then be reviewed via input device 338 (e.g., a keyboard and mouse, custom set of input buttons, touchscreen, etc.).

Figure 4:
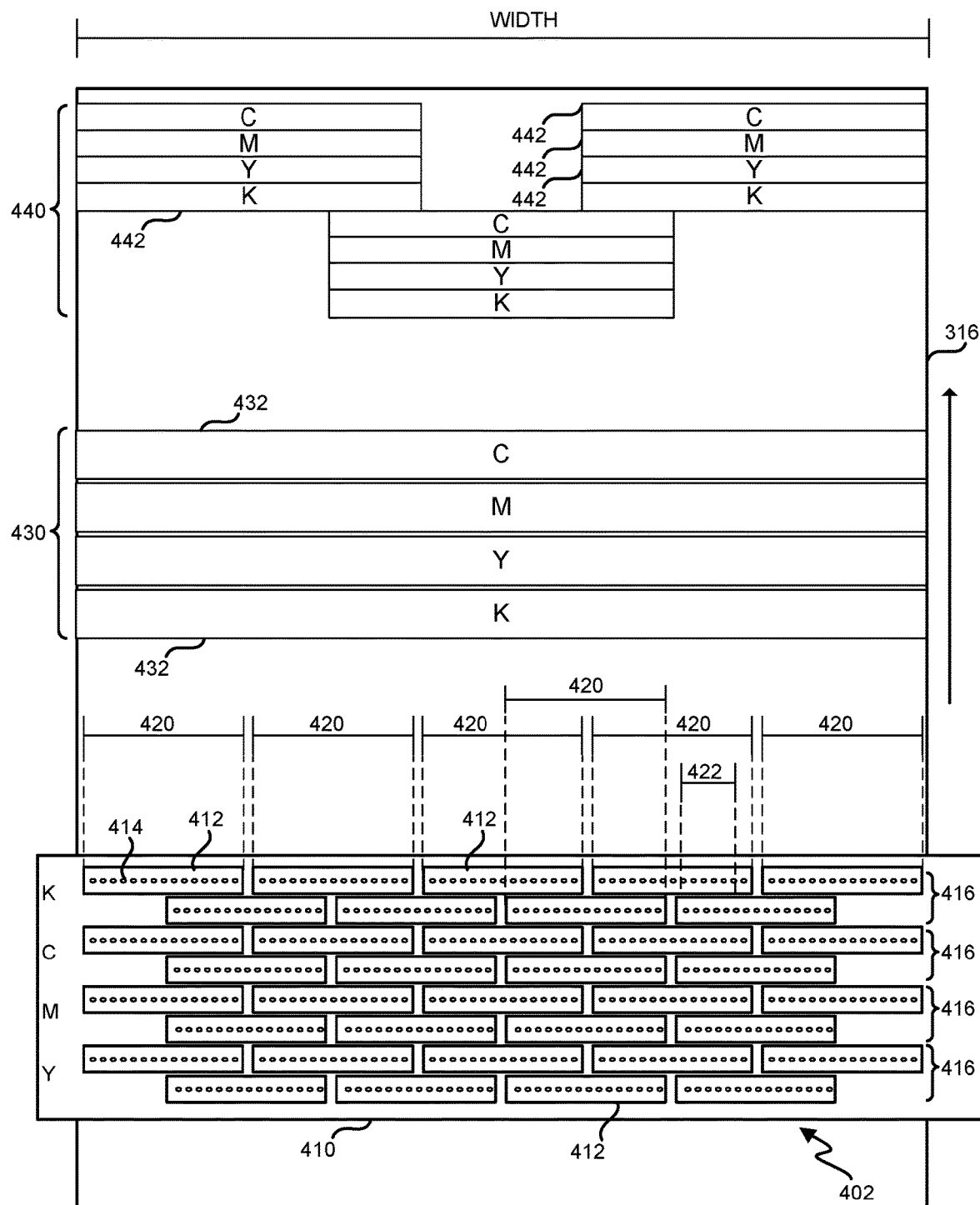
FIG. 4 depicts a marking engine applying test patterns to a web of print media in an illustrative embodiment.

FIG. 4 depicts a marking engine 402 applying test patterns 430 and 440 to a web 316 of print media in an illustrative embodiment. In this embodiment, test patterns 430 and 440 include bands 432 and 442 for color planes of Cyan (C), Magenta (M), Yellow (Y), and Key Black (K). The bands 432 and 442 are generated via the operation of marking engine 402. Specifically, one or more arrays 410 of printheads 412 for color planes 416 operate nozzles 414 to eject ink or another marking material onto web 316 of print media. Printheads 412 and/or nozzle 414 may be assigned to color planes/channels (e.g., cyan, magenta, yellow, key black, protector coating, clear, etc.) to eject the corresponding marking materials (e.g., cyan, magenta, yellow, key black, protector coating, clear, etc.). In this embodiment, the printheads 412 occupy regions 420 that are fixed along a width of the web 316 of print media. That is, each region 420 represents a portion of the width of the web 316 that is occupied by a specific printhead 412. In one embodiment, the regions 420 comprise locations 422, which each correspond with a grouping of ten to fifteen (or more) nozzles 414, however, this number may vary depending on the DPI of the printer and/or the scanner. The test patterns depicted in FIG. 4 may facilitate the detection of jetouts, misalignments, and/or other printhead conditions, and may be printed regularly at the start of each print job, after every page, after a predefined linear distance along web 316, etc.

Figure 5:
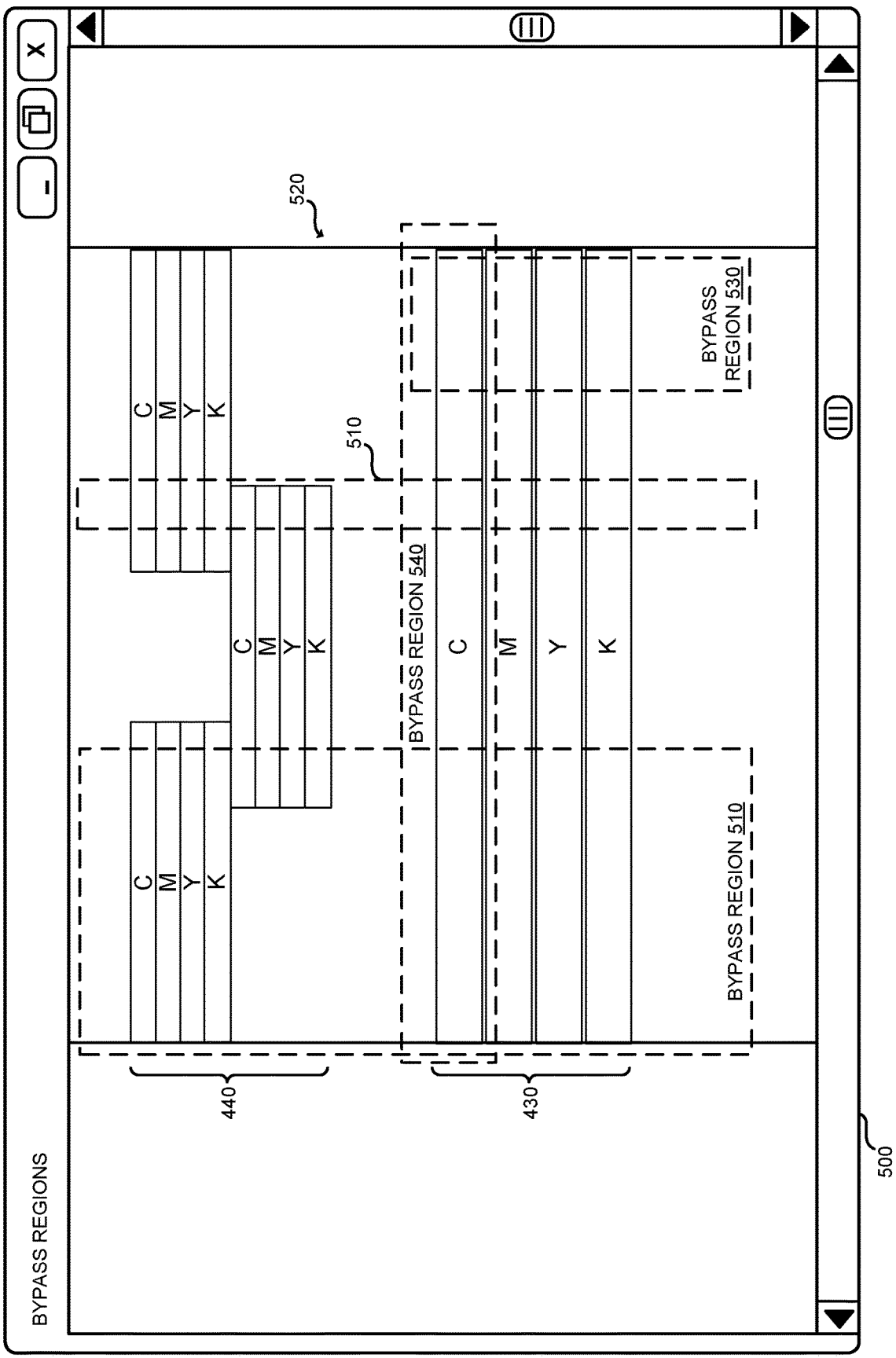
FIG. 5 depicts an image of test patterns acquired by a scanner imaging a web of print media in an illustrative embodiment.

With an understanding of the test patterns provided in FIG. 4, discussion moves to FIG. 5. FIG. 5 depicts an image of test patterns acquired by a scanner imaging a web of print media in an illustrative embodiment. Specifically, in FIG. 5, a window 500 presented via a display 136 depicts an image 520 of the test patterns. In this embodiment, bypass regions 510, which occupy all vertical positions (e.g., a column) along the image 520, are defined in order to suppress the analysis and/or reporting of printhead conditions in those regions. Each bypass region 510 corresponds with the one or more regions 420 in FIG. 4. In this embodiment, a bypass region 530 is also depicted. Bypass region 530 is utilized to suppress analysis and/or reporting of printhead conditions within a predefined two-dimensional portion of the image 520 (e.g., a portion of image 520 that does not encompass the entirety of the vertical dimension of the image 520). This enables suppression of reporting and/or analysis of test pattern 430, without doing the same to test pattern 440. A further bypass region 540, which is restricted to a single color plane (in this case, the color plane for C) is also depicted. Such a bypass region may be beneficial when a color plane is not utilized for a print job, or is utilized to a much lesser degree (e.g., less than half as much) as other color planes. Each of the bypass regions may correspond to combinations of one or more color planes, vertical positions along the image 520 and/or two dimensional portions of image 520.

Window 500 may be utilized by a print shop operator to determine which regions have been bypassed, and in some embodiments may be utilized by a print shop operator to manually flag (e.g., select) specific regions as bypassable. This may be accomplished by the operator clicking and dragging portions of image 520 to add new bypass regions 510, by adjusting the positions of the bypass regions 510, etc.

Figure 6:
FIG. 6 depicts a Graphical User Interface (GUI) for reviewing printhead conditions in an illustrative embodiment.

FIG. 6 depicts a Graphical User Interface (GUI) 600 for reviewing printhead conditions in an illustrative embodiment. In this embodiment shown in FIG. 4, the GUI 600 is formatted according to Hypertext Markup Language (HTML) in combination with Cascading Style Sheet (CSS) data in order to present a variety of elements reporting the status of a print job. The GUI 600 accesses data stored in memory that indicates each printhead condition, as well as the region and/or location, and graphically presents this information overlaid on top of an image acquired by scanning print media. That is, GUI 600 indicates each region as a two-dimensional area on an image of a test pattern. For the purposes of this embodiment, the primary GUI element comprises printer status regions 640 and 650. Each of these printer status regions 640 and 650 is subdivided into color planes 652. The printer status regions 640 and 650 indicate, on a printhead-by-printhead basis (or in some embodiments, a nozzle-by-nozzle basis), the printhead conditions experienced by each printhead of a printer. For example, printer status regions 640 and 650 may indicate the location of printheads that are experiencing jetout conditions. In this embodiment, fully operational printheads are indicated with symbols 644 and 654, while printheads experiencing a jetout at one or more nozzles are indicated with symbols 646 and 656, and printheads experiencing low ink conditions are indicated with symbols 648 and 658. This graphical presentation of printhead conditions allows a technician at the print shop to rapidly and intuitively locate printheads and/or nozzles that are experiencing issues at a printer 110.

GUI 600 also includes a carousel 630. Carousel 630 depicts notifications that are relevant to printer 110 and/or print review device 130. For example, notifications at carousel 630 may indicate the availability of firmware updates, the existence of calibration issues, etc.

The elements of the GUI further include a printer status section 610, which reports the current status of a printer 110 as indicated by a print controller of the printer 110, or a print server. A settings section 620 indicates settings for the print review device 130. The settings section 620 includes an indication of a number of tolerated jet-outs allowed at printheads of the printer 110 before an error is indicated or printing is halted. The settings section 620 also indicates a maximum number of cleaning attempts to perform on a printhead before reporting a jetout issue, and whether or not printheads are cleaned prior to the start of a print job. In this embodiment, the number of cleanings that are attempted before a printhead is reported as not cleaned is selectable by the user for when the printer prepares to print, while the number of attempts to clean before identifying a printhead as failed is separate. In one embodiment, five consecutive cleaning attempts are allowed to recover a specific nozzle. In a further embodiment, detected printhead failures are used to define bypassed regions.

Examples

In the following examples, additional processes, systems, and methods are described in the context of a print shop that performs dynamic review of printhead conditions.

Figure 7:
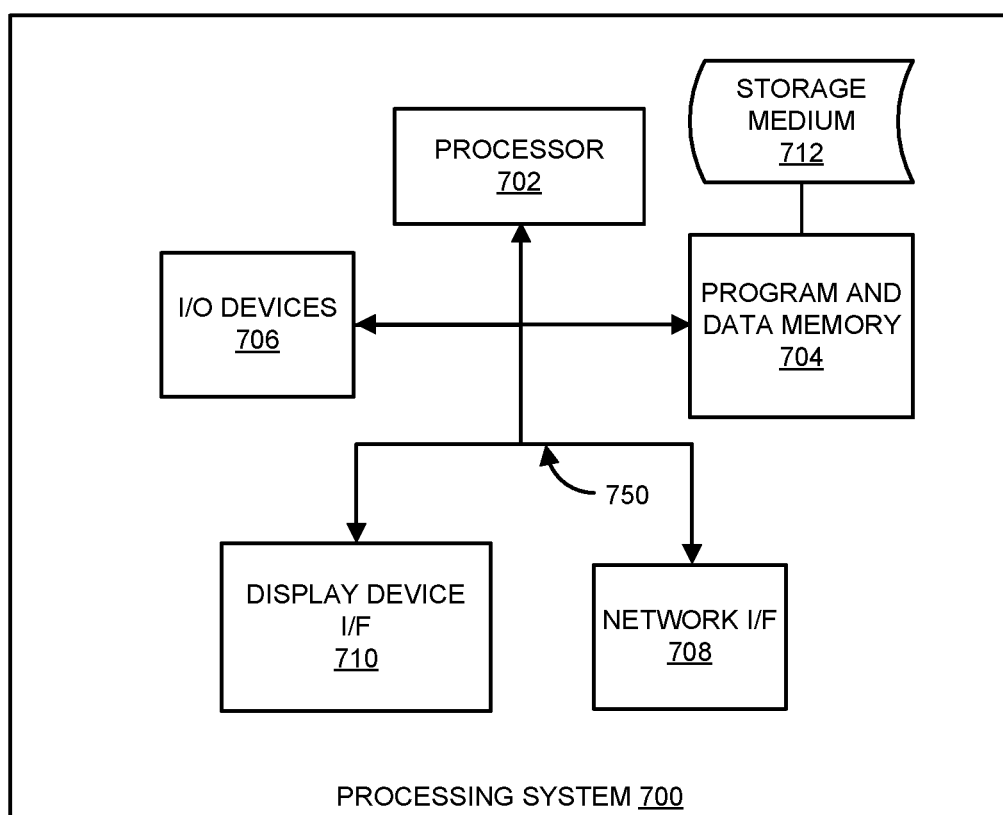
FIG. 7 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of print review system 100 to perform the various operations disclosed herein. FIG. 7 illustrates a processing system 700 operable to execute a computer readable medium embodying programmed instructions to perform desired functions in an illustrative embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

What is claimed is:

1. A system comprising:
    a print review device comprising:
        a memory that stores data which indicates whether regions along a width of print media marked by a printer are flagged as bypassable; and
        a controller configured to determine printhead conditions along the width of the print media, associate each printhead condition with a corresponding region, and to generate a report with notifications of printhead conditions within each region that has not been flagged, while suppressing notifications of printhead conditions within regions that have been flagged.

2. The system of claim 1 wherein:
    the print review device further comprises an image capture device configured to iteratively capture images in real-time as the printer prints; and
    the controller is configured to generate reports in real-time as the printer prints.

3. The system of claim 1 wherein:
    the controller is configured to generate reports for a printer that prints each of multiple color planes.

4. The system of claim 1 wherein:
    regions that are flagged as bypassable cause the printer to forego global error handling settings for the printer in that region.

5. The system of claim 1 wherein:
    the controller generates a user interface configured to indicate each region as a two dimensional area on an image of the test pattern.

6. The system of claim 1 wherein:
    printhead conditions are associated by the controller with locations having a width of at least ten nozzles at a printhead of the printer.

7. The system of claim 1 wherein:
    each of the printhead conditions is associated with a region based on a mapping of a location of that printhead condition to a region.

8. The system of claim 1 further comprising:
    the printer, the printer being configured to mark the print media.

9. A method comprising:
    storing data which indicates whether regions along a width of print media marked by a printer are flagged as bypassable;
    determining printhead conditions along the width of the print media;
    associating each printhead condition with a corresponding region; and
    generating a report with notifications of printhead conditions within each region that has not been flagged, while suppressing notifications of printhead conditions within regions that have been flagged.

10. The method of claim 9 further comprising:
    iteratively capturing images of the print media in real-time as the printer prints, wherein
    generate the report is performed in real-time as the printer prints.

11. The method of claim 9 further comprising:
generating reports for a printer that prints each of multiple color planes.

12. The method of claim 9 wherein:
foregoing global error handling settings at a printer that marks the print media in regions that have been flagged.

13. The method of claim 9 wherein:
the controller generates a user interface configured to indicate each region as a two dimensional area on an image of the test pattern.

14. The method of claim 9 further comprising:
associating printhead conditions locations having a width of at least ten nozzles at a printhead of the printer.

15. The method of claim 9 further comprising:
marking the print media via the printer.

16. A non-transitory computer readable medium embodying programmed instructions which, when executed by a processor, are operable for performing a method comprising:
storing data which indicates whether regions along a width of print media marked by a printer are flagged as bypassable;
determining printhead conditions along the width of the print media;
associating each printhead condition with a corresponding region; and
generating a report with notifications of printhead conditions within each region that has not been flagged, while suppressing notifications of printhead conditions within regions that have been flagged.

17. The medium of claim 16 wherein the method further comprises:
iteratively capturing images of the print media in real-time as the printer prints, wherein
generate the report is performed in real-time as the printer prints.

18. The medium of claim 16 wherein the method further comprises:
generating reports for a printer that prints each of multiple color planes.

19. The medium of claim 16 wherein:
foregoing global error handling settings at a printer that marks the print media in regions that have been flagged.

20. The medium of claim 16 wherein:
each of the printhead conditions is associated with a region based on a mapping of a location of that printhead condition to a region.

* * * * *